(12) United States Patent
Vanstone et al.

(10) Patent No.: US 8,953,787 B2
(45) Date of Patent: *Feb. 10, 2015

(54) STRENGTHENED PUBLIC KEY PROTOCOL

(75) Inventors: Scott A. Vanstone, Campbellvile (CA);
Alfred John Menezes, Waterloo (CA);
Minghua Qu, Mississauga (CA);
Donald B. Johnson, Manassas, VA (US)

(73) Assignee: Certicom Corp., Mississauga, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/527,891

(22) Filed: Jun. 20, 2012
(Under 37 CFR 1.47)

(65) Prior Publication Data

US 2012/0257758 A1    Oct. 11, 2012

Related U.S. Application Data

(63) Continuation of application No. 12/458,468, filed on Jul. 13, 2009, now Pat. No. 8,229,113, which is a continuation of application No. 10/185,735, filed on Jul. 1, 2002, now Pat. No. 7,567,669, which is a (Continued)

(51) Int. Cl.
*H04L 9/30* (2006.01)
*H04L 9/08* (2006.01)

(Continued)

(52) U.S. Cl.
CPC ............ *H04L 9/0841* (2013.01); *H04L 9/3066* (2013.01); *H04L 9/3252* (2013.01); *G06F 7/725* (2013.01)
USPC ................ 380/30; 380/44; 713/156; 713/171

(58) Field of Classification Search
CPC .... H04I 9/0811; H04L 9/0838; H04L 9/0816; H04L 63/062; H04L 9/0825; H04L 9/0861; H04L 9/3066; H04L 9/3852; G06F 7/725
USPC ......................... 380/28, 30, 44; 713/156, 171
See application file for complete search history.

(56) References Cited

U.S. PATENT DOCUMENTS

| 4,351,952 | A | 9/1982 | Foa et al. |
| 4,351,982 | A | 9/1982 | Miller et al. |

(Continued)

FOREIGN PATENT DOCUMENTS

| EP | 0383985 | 8/1990 |
| EP | 0535853 | 4/1993 |

(Continued)

OTHER PUBLICATIONS

Certicom Research: "Standards for Efficient Cryptography (SEC)", Sec. 1: "Elliptic Curve Cryptography", Version 1.0, Certicom Research: Pub., Sep. 20, 2000.*

(Continued)

*Primary Examiner* — Eleni Shiferaw
*Assistant Examiner* — Paul Callahan
(74) *Attorney, Agent, or Firm* — Fish & Richardson P.C.

(57) ABSTRACT

A method of determining the integrity of a message exchanged between a pair of correspondents. The message is secured by embodying the message in a function of a public key derived from a private key selected by one of the correspondents. The method comprises first obtaining the public key. The public key is then subjected to at least one mathematical test to determine whether the public key satisfies predefined mathematical characteristics. Messages utilizing the public key are accepted if the public key satisfies the predefined mathematical characteristics.

11 Claims, 1 Drawing Sheet

Related U.S. Application Data continuation-in-part of application No. 09/283,658, filed on Apr. 1, 1999, now Pat. No. 6,563,928, and a continuation-in-part of application No. 09/840,096, filed on Apr. 24, 2001, now abandoned, said application No. 09/283,658 is a continuation of application No. 08/649,308, filed on May 17, 1996, now Pat. No. 5,933,504, said application No. 09/840,096 is a continuation of application No. 08/949,781, filed on Oct. 14, 1997, now abandoned.

(51) Int. Cl.
*H04L 9/32* (2006.01)
*G06F 7/72* (2006.01)

(56) References Cited

U.S. PATENT DOCUMENTS

| | | |
|---|---|---|
| 4,405,829 A | 9/1983 | Rivest et al. |
| 4,633,036 A | 12/1986 | Hellman et al. |
| 4,868,877 A | 9/1989 | Fischer |
| 4,956,863 A | 9/1990 | Goss |
| 4,995,082 A | 2/1991 | Schnorr |
| 5,146,500 A * | 9/1992 | Maurer ............... 380/30 |
| 5,150,411 A | 9/1992 | Maurer |
| 5,159,632 A | 10/1992 | Crandall |
| 5,201,000 A | 4/1993 | Matyas et al. |
| 5,241,599 A | 8/1993 | Bellovin et al. |
| 5,271,061 A | 12/1993 | Crandall |
| 5,272,755 A | 12/1993 | Miyaji et al. |
| 5,299,263 A | 3/1994 | Beller et al. |
| 5,351,297 A | 9/1994 | Miyaji et al. |
| 5,442,707 A | 8/1995 | Miyaji et al. |
| 5,463,690 A | 10/1995 | Crandall |
| 5,497,423 A | 3/1996 | Miyaji |
| 5,581,616 A | 12/1996 | Crandall |
| 5,600,725 A | 2/1997 | Rueppel et al. |
| 5,625,692 A | 4/1997 | Herzberg et al. |
| 5,627,893 A | 5/1997 | Demytko |
| 5,661,803 A | 8/1997 | Cordery et al. |
| 5,666,416 A | 9/1997 | Micali |
| 5,724,425 A | 3/1998 | Chang et al. |
| 5,761,305 A | 6/1998 | Vanstone et al. |
| 5,768,388 A | 6/1998 | Goldwasser et al. |
| 5,933,504 A | 8/1999 | Vanstone et al. |
| 5,987,131 A | 11/1999 | Clapp |
| 6,052,469 A | 4/2000 | Johnson et al. |
| 6,058,188 A | 5/2000 | Chandersekaran et al. |
| 6,141,420 A | 10/2000 | Vanstone et al. |
| 6,192,130 B1 | 2/2001 | Otway |
| 6,209,091 B1 | 3/2001 | Sudia et al. |
| 6,563,928 B1 | 5/2003 | Vanstone et al. |
| 6,782,100 B1 | 8/2004 | Vanstone et al. |
| 7,215,773 B1 | 5/2007 | Johnson |
| 7,567,669 B2 | 7/2009 | Vanstone et al. |
| 2007/0147607 A1 | 6/2007 | Johnson |

FOREIGN PATENT DOCUMENTS

| | | |
|---|---|---|
| EP | 384475 B1 | 6/1994 |
| EP | 503119 B1 | 9/1995 |
| EP | 535863 B1 | 1/2002 |
| EP | 735720 B1 | 10/2006 |
| JP | 5-224604 | 9/1993 |
| JP | 06-043808 | 2/1994 |
| JP | 7326225 A | 12/1995 |
| JP | 09-062596 | 7/1997 |
| JP | 04191787 B1 | 12/2008 |

OTHER PUBLICATIONS

Antipas et al.: "Validation of Elliptic Curve Public Keys", Certicom Research, Springer-Verlag Berlin Heidelberg 2003, pp. 211-233.*

Menezes et al; IEEE P1363 Standard, Elliptic Curve Systems (Draft 2); Part 6; Standard for RSA, Diffie-Hellman and Related Public-Key Cryptography; dated Oct. 30, 1994, published as early as Nov. 1, 1994.

Search Report from European; Horbach, Christian; European Patent Office (EPO); Examiner; Publication Issued; Search completed Dec. 13, 2010; 10186311.5; 2 pages.

Abdella et al; DHIES: An Encryption System Based on the Diffie-Hellman Problem; Sep. 18, 2001; pp. 1-25.

Agnew et al; An Implementation of Elliptic Curve Cryptosystems Over F2155; IEEE Journal on Selected Areas in Communications; vol. 11, No. 5; Jun. 1993; pp. 804-813; IEEE, New York.

Arazi, B.; Integrating a Key Distribution Procedure into the Digital Signature Standard; Electronics Letters; vol. 29, No. 11; May 27, 1993.

Balenson et al; Privacy ENhancement for Internet Electronic Mail: Part III: Algorithms, Modes and Identifiers; RFC 1423; Sec. 4.1.1: RSA Keys; Feb. 1993.

Bender et al; On the Implementation of Elliptic Curve Cryptosystems; Proceedings on Advances in Cryptology; Jul. 1989; pp. 186-192.

Coffey et al; Logic for Verifying Public-Key Cryptographic Protocols; IEEE Proceedings: Computers and Digital Techniques, vol. 144, No. 1; Jan. 1997; pp. 28-32.

Gunther et al; An Identity-Based Key-Exchange Protocol; Advances in Cryptology—Eurocrypt '89; 1990; pp. 29-37; Springer-Verlag; Germany.

Koblitz, N.; A Course in Number Theory and Cryptography; Ch. VI Elliptic Curves, 2nd Edition; 1994; pp. 178-185; Springer-Verlag, New York.

Koblitz, N.; A Course in Number Theory and Cryptography; Ch. VI. Elliptic Curves; 1994; pp. 150-169; Springer-Verlag, New York.

Lim, C.H. and Lee, P.J.; A Key Recovery Attack on Discrete Log-Based Schemes Using a Prime Order Subgroup; Advances in Cryptology—Crypto '97; Aug. 17-21; pp. 249-263; Springer-Verlag.

Pohlig et al; An Improved Algorithm for Computing Logarithms Over GP(p) and Its Cryptographic Significance; IEEE Transactions on Information Theory; vol. IT-24, No. 1; ISSN:0018-9448; Jan. 1, 1978; pp. 106-110; IEEE.

Schneier; Applied Cryptography; 1st Ed.; 1994; pp. 144-145; John Wiley & Sons.

Schneier, B.; Applied Cryptography, Protocols, Algorithms, and Source Code in C; 2nd Ed.; 1996; pp. 476-481 and 513-525; John Wiley & Sons.

Schnorr, C.P.; Efficient Signature Generation By Smart Cards; Journal of Cryptology, 4; 1991; pp. 161-174; Springer-Verlag, New York.

Schroeppel et al; Fast Key Exchange with Elliptic Curve Systems; Mar. 31, 1995; pp. 1-9.

Van Tilborg, H.; Elliptic Curve Cryptosystems; Too Good to be True?; Nieuw Archief Voor Wiskunde; vol. 2, No. 3; Sep. 2001; pp. 220-225; Stichting Mathematisch Centrum.

Abdalla, M. et al.; "Dhies: An Encryption System Based on the Diffie-Hellman Problem"; Sep. 18, 2001; pp. 1-25.

Antipa, A. et al; "Validation of Elliptic Curve Public Keys"; PKC 2003, LNCS 2567; pp. 211-223; 2003.

Adams C. and S. Farrell; "Internet X.509 Public Key Infrastructure: Certificate Management Protocols"; RFC 2510; Mar. 1999. Available from http://www.ietforg/rfc/rfc2510.txt.pdf.

ANSI X9.62; "Public Key Cryptography for the Financial Services Industry: The Elliptic Curve Digital Signature Algorithm (ECDSA)"; American National Standards Institute; 1999.

ANSI X9.63; "Public Key Cryptography for the Financial Services Industry: Key Agreement and Key Transport using Elliptic Curve Cryptography"; American National Standards Institute; 2001.

Bailey, D., A. Singer and W. Whyte, "IEEE P802-15 TG3 NTRU Full Security Text Proposal"; Submission to the IEEE P802.15 Working Group for Wireless Personal Area Networks (WPANs); Apr. 22, 2002. Available from http://grouper.ieee.org/groups/802/15/pub/2002/May02/02210r0P802-15 TG3-NTRU-Full-Security-Text-Proposal.pdf.

Bellare, M. and P. Rogaway; "Minimizing the Use of Random Oracles in Authenticated Encryption Schemes"; Information and Communications Security; Lecture Notes in Computer Science; vol. 1334; 1997; 1-16.

(56) References Cited

OTHER PUBLICATIONS

Biehl, I., B. Meyer and V. Mueller; "Differential Fault Analysis on Elliptic Curve Cryptosystems"; Advances in Cryptology—CRYPTO 2000l Lecture Notes in Computer Science; vol. 1880; 2000; pp. 131-146.

Blake-Wilson, S., D. Brown and P. Lambert; "Use of Elliptic Curve Cryptography (ECC) Algorithms in Cryptographic Message Syntax (CMS)"; RFC 3278; Apr. 2002. Available at http://www.ietforg/rfc/rfc3278.txt.pdf.

Boneh, D., R. DeMillo and R. Lipton; "On the Importance of Checking Cryptographic Protocols for Faults"; Advances in Cryptology—EUROCRYPT '97; Lecture Notes in Computer Science; vol. 1233; 1997; pp. 37-51.

Chae Hoon Lim et al., "A Key Recovery Attack on Discrete Log-Based Schemes Using a Prime Order Subgroup", Lecture Notes in Computer Science, Springer-Verlag, Aug. 1997, vol. 1294, p. 249-263.

FIPS 186-2; Digital Signature Standard (DSS); Federal Information Processing Standards Publication 186-2; National Institute of Standards and Technology; 2000.

Gupta, V., S. Blake-Wilson, B. Moeller and C. Hawk; "ECC Cipher Suites for TLS"; IETF Internet-Draft; Aug. 2002. Available from http://www.ietf.org. 32 pages.

IEEE Std 1363-2000; "IEEE Standard Specifications for Public-Key Cryptography"; 2000.

IEEE P1363a; "Draft Standard Specifications for Public-Key Cryptography—Amendment 1: Additional Techniques"; Working Draft 10.5; Apr. 26 2002. Available from http://grouper.ieee.org/groups/1363/tradPK/P1363a/draft.html.

IEEE P1363a-2004; "IEEE Standard Specifications for Public-Key Cryptography—Amendment 1: Additional Techniques"; Sep. 2, 2004; 168 pages.

Ikeno Shinichi et al., "Gendai Angou-ron (Modern Cryptology)", Syadan-hojin Denshi-Tsushin Gakkai, Sep. 1, 1986, 1st Ed., p. 105-108 Cited in Office Action issued in Japanese Application No. 2010-5363 on Jun. 8, 2012.

ISO/IEC 15946-2; "Information Technology—Security Techniques—Cryptographic Techniques Based on Elliptic Curves—Part 2: Digital Signatures"; Draft; Feb. 2001.

ISO/IEC 15946-3; "Information Technology—Security Techniques—Cryptographic Techniques Based on Elliptic Curves—Part 3: Key Establishment"; Draft; 2001; 35 pages.

Johnson, D.; "Contribution to ANSI X9F1 Working Group"; 1997.

Johnson, Don B.; "Key Validation"; Nov. 1997; Contribution to IEEE P1363 Working Group; 20 pages.

Johnson, Don, B.; "Public Key Validation: A Piece of the PKI Puzzle"; Submission of IEEE P1363; Mar. 10, 2000; 11 pages.

Jurisic, A. et al; "Elliptic Curves and Cryptography Strong Digital Signature Algorithms"; Dr. Dobb's Journal; Apr. 1997; 6 pages.

Koblitz, N.; "Elliptic Curve Cryptosystems"; Mathematics of Computation; vol. 48, No. 177; Jan. 1987; pp. 203-209.

Krawczyk, H.; "SKEME—A Versatile Security Key Exchange Mechanism for Internet"; 1996; pp. 114-127.

Law, L., A. Menezes, M. Qu, J. Solinas and S. Vanstone; "An Efficient Protocol for Authenticated Key Agreement"; Aug. 1998; 18 pages.

Lenstra, H.; "Factoring Integers with Elliptic Curves"; Annals of Mathematics; 126; 1987; pp. 649-673.

Menezes, A.; "Elliptic Curve Public Key Cryptosystems"; Kluwer Academic Publishers; 1993.

Menezes, A. et al.; "Elliptic Curve Public Key Cryptosystems and Their Implementation"; Journal of Cryptology; 1993; pp. 209-224.

Myers, M., C. Adams, D. Solo and D. Kemp; "Internet X.509 Certificate Request Message Format"; RFC 2511; Mar. 1999. Available from http://www.ietf.org.

"SKIPJACK and KEA Algorithm Specifications"; vol. 2.0; May 29, 1998; 23 pages.

Solinas, J.; "Efficient arithmetic on Koblitz Curves"; Designs, Codes and Cryptography; 19; 2000; pp. 195-249.

Prosecution History Documents for European Application No. 98947262.6 filed Oct. 14, 1998; 233 pages.

Office Action issued in Japanese Application No. 2010-5363 on Jun. 8, 2012; 9 pages (with translation).

Menezes et al. "Elliptic Curves and Cryptography", Dr. Dobbs Journal, Apr. 1, 1997, pp. 1-16.

Office Action issued in U.S. Appl. No. 13/620,758 on Jan. 4, 2013; 15 pages.

Schneier, Applied Cryptography, 2nd Ed; pp. 476 to 479, 480, 481, 513 to 525; Oct. 1985; John Wiley & Son. Arazi, B; Integrating a Key Distribution Procedure into the Digital Signature Standard; Electronics Letters, May 27, 1993; vol. 29, No. 11.

\* cited by examiner

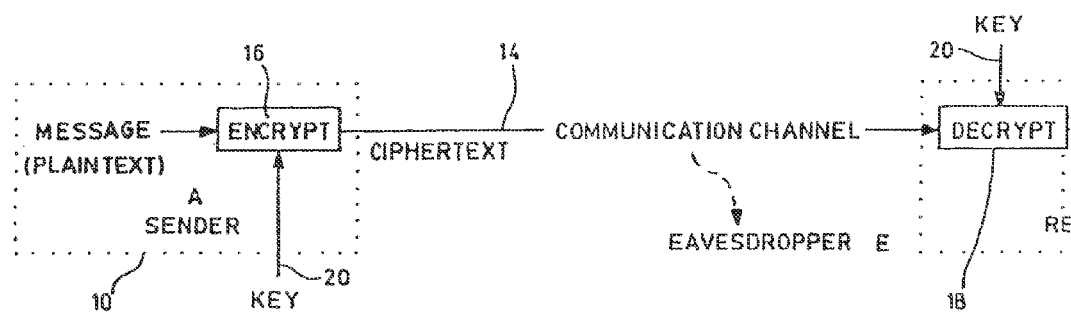

STRENGTHENED PUBLIC KEY PROTOCOL

CROSS-REFERENCE TO RELATED APPLICATIONS

This application is a continuation of U.S. application Ser. No. 12/458,468, filed on Jul. 13, 2009, now U.S. Pat. 8,229,113, which is a continuation of U.S. continuation-in-part application Ser. No. 10/185,735, filed on Jul. 1, 2002, now U.S. Pat. No. 7,567,669, which is a continuation-in-part of application Ser. No. 09/283,658 filed Apr. 1, 1999, now U.S. Pat. No. 6,563,928 which is a continuation of application Ser. No. 08/649,308 filed May 17, 1996, now U.S. Pat. No. 5,933,504 all of which are incorporated by reference. U.S. application Ser. No. 10/185,735 is also a continuation-in-part of application Ser. No. 09/840,096 filed Apr. 24, 2001 which is a continuation of application Ser. No. 08/949,781, filed on Oct. 14, 1997 all of which are incorporated by reference.

FIELD OF THE INVENTION

The present invention relates to secure communication systems and in particular to schemes for validating parameters and keys in such systems.

BACKGROUND OF THE INVENTION

Secure data communications systems are used to transfer information between a pair of correspondents. At least part of the information that is exchanged is enciphered by a predetermined mathematical operation by the sender. The recipient may then perform a complementary mathematical operation to decipher the information. For public key or symmetric key systems, there are certain parameters that must be known beforehand between the correspondents. For example, various schemes and protocols have been devised to validate the sender's public key, the identity of the sender and the like. The security or validity of these systems is dependent on whether the signature is a valid signature and this is only the case if system parameters if any are valid, the public key is valid and the signature verifies. Furthermore, an asymmetric system is secure only if system parameters if any are valid, the enciphering public key is valid, the symmetric key is formatted as specified and the symmetric key. recovery checks for format validity, It is well known that data can be encrypted by utilising a pair of keys, one of which is public and one of which is private. The keys are mathematically related such that data encrypted by the public key may only be decrypted by the private key. In this way, the public key of a recipient may be made available so that data intended for that recipient may be encrypted with the public key and only decrypted by the recipients private key.

One well-known and accepted public key cryptosystem is that based upon discrete logarithms in finite groups. Different finite groups may be used, for example the multiplicative group Zp* of integers mod p where p is a prime; the multiplicative group of an arbitrary finite field e.g., GF2$^n$ or an elliptic curve group over a finite field.

The discrete log problem used in such cryptosystems is based on the difficulty of determining the value of an integer x from the value of $\alpha^x$, even where $\alpha$ is known. More particularly, if $\alpha$ is an element of a group G (which is considered to be written multiplicatively) and $\beta$ is a second element of G, then the discrete logarithm problem in G is that of determining whether there exists an integer x such that $\beta=\alpha^x$, and if so, of determining such a value x.

The Diffie-Hellman key exchange protocol is widely accepted and there are numerous examples of implementations of the Diffie-Hellman protocol in use around the world.

The Diffie-Hellman key agreement protocol is typically stated as follows using as an example the finite group $Z_p^*$:
Setup The protocol requires a base a that generates a large number of elements of the selected group G and a pair of integers x, y that are retained confidentially by respective correspondents A,B. Select a prime number p and let $\alpha$ be a generator of the multiplicative group $Z_p^*$, i.e., the group of integers modulo p.
The Protocol 1. Correspondent A generates a random integer x, computes $\alpha^x$ and sends this to correspondent B.
2. Correspondent B generates a random integer y, computes $\alpha^y$ and sends this to correspondent A.
3. A computes $(\alpha^y)^x = \alpha^{xy}$.
4. B computes $(\alpha^x)^y = \alpha^{xy}$.

A and B now share the common key $\alpha^{xy}$ which may be used as a secret key in a conventional cryptosystem. A similar protocol may be used in a public key system, generally referred to as an El-Gamal protocol in which each correspondent has a secret key x and a public key $\alpha^x$.

The security of these protocols seems to rest on the intractability of the discrete logarithm problem in the finite group G. It should also be noted that the protocol carries over to any finite group.

On the other hand a key agreement protocol is secure only if the system parameters, if any, are valid, the key agreement public keys are valid, and the shared secret and symmetric key is derived as specified in a standard. In all of these it is assumed that the public key or symmetric key, i.e. the shared secret, is derived and valid as specified in the protocol scheme. Problems, however, will arise if these parameters are either bogus or defective in some way.

The following scenarios may illustrate the implications of a defect in one or more parameters of a public key cryptographic system. For example digital signatures are used to indicate the authenticity of a sender. Thus if a Recipient A receives a certified public key from a Sender B, then A verifies the certificate, next B sends A a signed message for which A is able to verify the signature and thus assume that further communication is acceptable. In this scenario, however, if B has deliberately corrupted the public key then the Recipient A has no way of distinguishing this invalid public key. Similarly, a Participant C generates a key pair and then subsequently receives a public key certificate, the Participant C then sends the certificate and a subsequent signed message to B under the assumption that the public key contained in the certificate is valid. The participant B can then determine key information for C. Both the above scenarios describe possible problems arising from utilizing unauthenticated parameters in signature verification In key transport protocols a Correspondent A may inadvertently send its symmetric key to the wrong party. For example, if Correspondent A receives a certified public key from a Sender B, the certificate is verified by A who then sends a public key enciphered symmetric key and a symmetric key enciphered message to B, thus A is comprised. Conversely, if one of the correspondents C generates a key pair and gets a public key certificate which is subsequently sent to A who public key enciphers a symmetric key and message and sends it back to C, thus, in this case, C is compromised.

In key agreement protocols, one of the correspondents, A for example, receives a certified public key from B and sends B A's certified public key. Each of A and B verify the others certificate and agree upon a symmetric key. In this scenario A is compromised twice.

It may be seen from the above scenarios that although public key systems are secure the security of the system relies to a large extent on one or both of the correspondents relying on the fact that a claimed given key is in fact the given key for the particular algorithm being used. Typically the recipients receive a string of bits and then make the assumption that this string of bits really represents a key as claimed. This is particularly a problem for a symmetric key system where typically any bit string of the right size may be interpreted as a key. If a bit in the key is flipped, it may still be interpreted as a key, and may still produce a valid crypto operation except that it is the wrong key.

In an asymmetric private key system the owner of the private key knows everything about the private key and hence can validate the private key for correctness. However, should a third party send the owner system a public key, a question arises as to whether the received key conforms to the arithmetic requirements for a public key or the operations using the claimed public key is a secure crypto operation. Unless the owner system performs a check it is unlikely to know for certain and then only by the owner.

SUMMARY OF THE INVENTION

The applicants have now recognized that unless the generator a and the group G are selected carefully then the exchange of information may be weak and provide almost no security.

To explain the potential problem, consider the cryptosystem described above using the group $Z_p^*$. The modulus p is public information that defines the cryptosystem and can be expressed as t.Q+1 with t≥2 and t relatively small. This is always possible since p is odd for large primes (i.e., t could be 2).

Let S be a subgroup of $Z_p^*$ of order (i.e. it has t elements, each of which is element of $Z_p^*$) and let γ be a base for S, i.e. each element of S can be expressed as an integral power of γ and raising γ to an integral power produces an element that is itself in the subgroup S. If a is a generator for $Z_p^*$, then we can take $γ=α^Q$ without loss of generality.

If E is an active adversary in the key exchange protocol between two parties A and B then the attack proceeds as follows:
1. E intercepts the message $α^x$ sent by A and replaces it by $(α^x)^Q=γ^x$ and sends it on to entity B.
2. E intercepts the message $α^y$ sent by B and replaces it by $(α^y)^Q=γ^y$ and sends it on to entity B.
3. A computes $(γ^y)^x=γ^{xy}$.
4. B computes $(γ^x)^y=γ^{xy}$.
5. Although E does not know the key $γ^{xy}$, E knows that the common key $γ^{xy}$ lies in the subgroup S of order t as γ is a generator of S. By definition $γ^{xy}$ must produce an element in the subgroup S. Since S is of order t it has precisely t elements. If t is small enough then E can exhaustively check all possibilities and deduce the key.

Since E selects Q, t can always be taken to be 2 and so the threat is practical.

A similar attack may be mounted with cryptosystems using groups other than $Z_p^*$ which will be vulnerable if the element selected as a base or generator generates a subgroup which itself has a small subgroup of order t.

It is therefore an object of the present invention to provide a method for checking if modification of messages has occurred or in the alternative some method to prevent the attack from being mounted.

in general terms; the present invention is based upon utilization of predefined characteristics of the order of the subgroup.

This invention seeks to provide an improved validation in a secure communication system. Furthermore the invention seeks to allow such a validation to be performed by anyone at anytime using only public information.

In one aspect, the base of the cryptosystem is chosen to be a generator of a subgroup of a relatively large prime order. Substitution of any other non-unit generator is of no advantage to an attacker since it does not produce an element in a smaller subgroup that can be exhaustively searched.

In another aspect, factors of the order of the group generated by the base are used to ensure that the key does not lie in or has not been modified to lie in a proper subgroup of relatively small order, i.e. one that may feasibly be exhaustively searched by an interloper.

According to a further aspect of the present invention there is provided a method of determining the integrity of a message exchanged between a pair of correspondents, the message being secured by embodying the message in a function of a public key derived from a private key selected by one of the correspondents, the method comprising the steps of:
 a) obtaining the public key;
 b) subjecting the public key to at least one mathematical test to determine whether the public key satisfies predefined mathematical characteristics; and
 c) accepting messages utilizing the public key if the public key satisfies the predefined mathematical characteristics.

According to a further aspect of the present invention there is provided a cryptographic unit for use in a data communication system established between a pair of correspondents exchanging public information across a communication channel by way of a public key encryption scheme. The unit includes a monitor to receive a public key from one of the correspondents and subject the public key to at least one mathematical test to determine whether the public key satisfies predefined mathematical characteristics.

BRIEF DESCRIPTION OF THE DRAWINGS

Embodiments of the invention will now be described by way of example only with reference to the accompanying drawings, in which FIG. 1 is a schematic representation of a data communication system.

DETAILED DESCRIPTION OF THE PREFERRED EMBODIMENTS

Referring therefore to FIG. 1, a pair of correspondents, 10, 12, denoted as correspondent A and correspondent B, exchange information over a communication channel 14. A cryptographic unit 16, 18, is interposed between each of the correspondents 10, 12 and the channel 14. A key 20 is associated with each of the cryptographic units 16, 18 to convert plain text carried between each unit 16, 18 and its respective correspondent 10, 12 into ciphertext carried on the channel 14. In addition the system may include a certification authority.

In operation, a message generated by correspondent A, 10, is encrypted by the unit 16 with the key 20 and transmitted as ciphertext over channel 14 to the unit 18.

The key 20 operates upon the ciphertext in the unit 18 to generate a plaintext message for the correspondent 8, 12. Provided the keys 20 correspond, the message received by the correspondent 12 will be that sent by the correspondent 10.

Embodiments of the invention shall be described with reference to aspects of public key algorithms. In order for the system shown in FIG. 1 to operate it is necessary for the keys 20 to be identical and therefore a key agreement protocol is established that allows the transfer of information in a public manner to establish the identical keys. In a first embodiment, the key agreement protocol has six routines which are defined as system parameter generation, system parameter validation, key pair generation, public key validation, shared secret derivation and symmetric key derivation.

A number of protocols are available for the key generation and most are variants s\ of the Diffie-Hellman key exchange. Their purpose is for parties A and B to establish a secret session key K. In the key validation step, anyone at anytime can validate a public key using only public information. These routines validate the range and order of the public key. If a public key validates, it means that an associated private key can logically exist, although it does not prove it actually does exist.

The system parameters for these protocols are a multiplicative group G and a generator $\alpha$ in the group G. Both G and $\alpha$ are known. Correspondent A has private key x and public key $P_A = \alpha^x$. Correspondent B has private key y and public key $P_B = \alpha^y$. Correspondent A and B exchange respective public keys and exponentiate with their private keys to obtain a common session key $\alpha^{xy}$.

As noted above, the key exchange and therefore the ciphertext, is vulnerable if interloper E intercepts the transmission of $\alpha^x$ and $\alpha^y$ and raises each to the power Q.

In a first embodiment, the attack is foiled by defining the system parameters appropriately so that no advantage is provided to the interloper by performing a substitution. Moreover, the base or generator of the cryptosystem is selected so that tampering with the key exchange between A and B can be detected.

By way of example, for a public key system using the group $Z_p^*$, initially a subgroup S of $Z_p^*$ is selected which has a prime order. The subgroup S of prime order q will only have subgroups of order 1 or the prime q itself. For example, if p is chosen as 139 then $Z_{139}^*$ contains subgroups of order 1, 2, 3, 6, 23, 46, 69 and 138. Of these, the subgroups of order 2, 3 and 23 are of prime order.

Accordingly, if the base used in the public key system is chosen to be a generator $\gamma$ of a subgroup S of $Z_p^*$ of prime order q rather than a generator x of $Z_p^*$ itself, an attempt by the interloper to substitute a smaller subgroup may be readily detected.

For example, 34 is a generator of the subgroup of order 23 in $Z_{139}^*$. Therefore the base is chosen to be 34 for key exchange and generation.

The selection of the subgroup S of prime order q restricts the interloper E to an exponent of either 1 or the prime q, i.e. 23 in the example given. If the exponent is chosen to be the order q of the subgroup S then the message produced from the generator of the subgroup exponentiated to q will be the identity element, i.e., 1 in the example given. Therefore one or both correspondents may check the message and if it corresponds to the identity element it is rejected.

Selection by the interloper E of the exponent to be 1 will of course not be of use as the discrete log problem will still be intractable and provided the order of the subgroup is sufficiently large a brute force approach is impractical.

It will of course be understood that the example given of p=139 is for illustrative purposes only and that in practical implementations the prime p will be of the order of $10^{150}$ and the order of the subgroup will typically exceed $10^{40}$.

In a second embodiment, the order of the subgroup need not be prime and the attack is foiled by monitoring the received message. The order of the subgroup may therefore have a number of small divisors, $t_1$, $t_2$ which are sufficiently small to render the exchange vulnerable. To foil such a substitution, at least one of the correspondents A,B takes the message received from the other correspondent, i.e., $\alpha^x$ for B or $\alpha^y$ for A and raises the message to the power t for each small divisor of (p-1). If the result is 1 it indicates that a new value of the message may have been substituted, as $(\alpha^x)^{Q \cdot t}$ mod (p-1) will always be 1. The fact that the result is 1 is not determinative that a substitution has been made but the probability that $(\alpha^x)^t = 1$ for large values of p is small. The key exchange can be terminated if the result is 1 and a new key exchange initiated. If with different values of private keys x and y successive key exchanges yield a result of 1 when tested above, then it is assumed that an interloper is actively monitoring the data exchange and further communication is terminated.

The determination of the value $\alpha^{xt}$ may be made by exponentiation of the message $\alpha^x$ with the possible values of t by an exhaustive search. Alternatively, given the order of the subgroup, values of the message that yield the group identity can be tabulated and a simple comparison made to determine if the message is vulnerable.

As a third embodiment, the value of p is selected to be of the form 2q+1 where q is itself a prime. The only subgroups of $Z_p^*$ have orders 1, 2, q and 2q. The generator of the subgroup of order q is selected for the key exchange so that 't' can only be 1 or q, If the subgroup of order 1 is selected then the message $(\alpha^x)^Q$ will be the identity element, e.g. 1, and this can readily be checked q will be selected to be relatively large to render an attack on the discreet log problem unfeasible.

The above techniques provide a clear indication of an attempt by an interloper to substitute a subgroup and a foil that is readily implemented by a careful selection of the generator and a check for the identity element.

The above examples have utilized the group $Z^{p*}$ but other groups may be used as noted above, for example, an elliptic curve group over a finite field. In the case of an elliptic curve over the field $F_p$ elements where p is a prime power, there is an elliptic curve group G for each integral order lying between $p+1-2\sqrt{p}$, and $p+1+2\sqrt{p}$. With high probability, there is a prime q lying in this interval and by selecting this elliptic curve group, $G_q$, of order q for use in the cryptosystem, the group $G_q$ will only have subgroups of order 1 and the prime q itself. Accordingly, selection of the group $G_q$ will avoid substitution of subgroups of relatively small order and any attempt at substitution will not yield any benefits to the interloper.

A particularly convenient finite field is the field $F_2m$ which may be used for the generation of elliptic curve groups.

As an alternative approach to the selection of a group of prime order, the order of the elliptic curve may be chosen of order n, where n is not a prime and messages are monitored by at least one of the correspondents. The integrity of the message is verified by raising the message to the power d for each small divisor d of the order n. In this case, if the result is the group identity, typically 0, then it is assumed that a substitution has been made and the transmission is terminated.

Again, therefore, a group is selected that is either of prime order to inhibit substitution or a group is chosen to have an order with small divisors. In each case, substitution can be checked by monitoring the message by at least one of the correspondents.

Similar considerations will apply in other groups and careful selection of the order of the groups utilized will provide the benefits described above.

An alternative attack that may be utilized is for the interloper E to substitute a new message "e" for that transmitted from A to B and vice versa, The new message a is chosen to be an element of a subgroup S of the group G of low order, i.e. a relatively small number of elements. When B receives the message e he exponentiates it with his secret key y to generate the session key. Similarly, when A receives the message a he exponentiates it with the secret key x to generate the session key.

Exponentiation of an element of a subgroup will produce an element within that group so that the session keys generated by A and B lie in the subgroup S. If S is of relatively low order, there is a reasonable chance that the keys generated by A and B will be identical. In that case a message encrypted with the session key may be intercepted and the small number of possibilities that exist for the key can be tried by E.

If the keys are not identical then the failure will be attributed to system errors and a new attempt will be made to establish a key. This provides E with a further opportunity to substitute a different element of the subfield S in the transmission with a real probability that a correspondence will be established. Because of the relatively small number of possible elements, the possibilities may be exhausted and a correspondence made within the normal operating parameters of the system.

To overcome this possibility, the order of the group is selected to have factors that are either large primes or provide trivial solutions that disclose themselves upon simple examination. In the case of the group $Z_p^*$, a suitable form is for the value of the modulus p to be of the form 2qq'+1 where q and q' are both large primes. The subgroups S of $Z_p^*$ will be of order 2, q or q'. Adopting a subgroup of order 2 will provide only two possible elements which can readily be checked and, if present as the session key, the session can be terminated.

The values of q and q' will not be readily ascertained due to the difficulty of factoring the products of large primes.

Even if an exhaustive attack on the subgroup of order q or q' is viable for E, such an attack will reveal itself by a large number of repeated attempts at establishing communication. Accordingly, an upper limit may be established after which communication will be terminated. The appropriate number of attempts will be based on the factors of p−1 and the nature of the communication system.

Again, therefore, the attacks by E can be resisted by checking for values of the session key that are indicative of the vulnerability of the session and by appropriate selection of the order of the group. It will be recognised that selection of the modulus of the form 2q+1 as exemplified in the third embodiment above provides the requisite robustness for resisting a substitution attack by E.

These techniques are also effective. to prevent interloper E from taking a known public key $\alpha^a$, raising it to an appropriate power such that $\alpha^{aQ}$ is in a small subgroup. The interloper can then determine aQ, and use this as his private key. There are situations where the interloper can use this to impersonate correspondent A and also convince a certifying authority to certify the public key $\alpha^{aQ}$ since the interloper E can prove he knows aQ.

In the above examples, the checking for elements lying in subgroups of relatively small order has been performed by exponentiating the message to the power of the small divisors of the order of the group. An alternative method which will indicate whether or not the message lies in a proper subgroup, without necessarily identifying the order of the subgroup, is to exponentiate the message to the order $n/p$ where n is the order of the group and p ranges over all prime divisors of n. If the result is the group identity (1 in the case of $Z_0^*$) then it indicates that the message does lie in a subgroup. Depending upon the strategy used to determine the order of the group G, it is possible either to reject the message or to test further to determine the order of the subgroup.

In a further embodiment implementing an elliptic curve Digital Signature Algorithm (ECDSA) there are also six routines, defined as system parameter generation, system parameter validation, key pair generation, public key validation, signature generation and signature verification. On the other hand a first type of DSA has four routines, namely system parameter generation, key pair generation, signature generation and signature verification. In a more recent DSA there are five routines, namely, system parameter generation, (implicit) system parameter validation, key pair generation, signature generation and signature verification. In order to provide key validation the DSA parameters p, q, and g are assumed to have already been validated. The public key $y=g^x$ mod p, where x is the private key. The range of y is validated to ensure 1<y<p and the order of y is validated to ensure $y^q$ mod p=1. These tests ensure that a claimed DSA public key meets the arithmetic requirements of such a key. They can be performed by anyone at anytime using only public information.

In RSA or Rabin signatures there are generally three routines, namely key pair generation, signature generation and signature verification. Validating an RSA public key (n, e) involves three steps. Firstly validate e, secondly validate n and thirdly validate a and n are consistent with each other. In order to validate the public exponent e, use of made of the fact that the exponent $2<e<=2^{(k-160)}$ where k is the length of the modulus n. The requirement that this range be as it is specified is specifically to allow this check. If e>2 then a should be odd, Furthermore, if for a closed network, it is known that the public exponent e must all meet other criteria, e.g., it must be =3 or 65537 or be a random number larger than 65537, these checks can also be done to further confirm the validity of the key. These checks may be incorporated as part of the specification of an RSA public key partial validation routine. Even though the above test for a appears trivial, this test ensures that e was selected before d as intended by the RSA/Rabin algorithm since, it may be shown that de=1 mod (1cm (p−1,q−1)) and there are at least 160 high order zeroes in e when compared with modulus n, and this is infeasible to achieve by selecting d first.

In order to validate the modulus n, the sizes of n may be determined. It is known that n is supposed to contain exactly (1,024 plus 128 s) bits, where s=0, 1, 2, 3 . . . etc. This can be easily validated and can be part of a partial key validation. Determining whether the modulus n is odd given that n is supposed to be the product of two primes and that all primes after 2 are odd may perform a further validation of the modulus n. Therefore the product of odd numbers is odd so n should be odd. Furthermore, for Rabin when e=2 we know p should be equal to 3 mod n and q should be 7 mod 8. This means n=pq should be =21 mod 8=5 mod 8. This can be validated by ensuring that if e=2, then n=5 mod 8. Furthermore, we know n should not be a perfect power thus this ensures there be two distinctive prime factors and this can be validated by a simple check as documented in the Handbook of Applied Cryptography by Menezes, van Oorschot, and Vanstone.

It is also known that n should be a composite number thus if n is prime the transformation is easily invertible and hence is completely insecure. The fact that n should be composite can be validated by running the Miller-Rabin probable prime test expecting it to actually prove that n is composite. An additional test for validating the modulus n is based on knowing that n is supposed to be the product of two large primes and is supposed to be hard to factor. Therefore attempt to factor it in some simple way, expecting it to fail. For example calculate GCD (n, i) where i runs through all the small odd primes up to a certain limit, say the first 50K odd primes.

From the previous two tests above, it may be seen from the former that at least one factor must be of a size of half the bits of the modulus or less. From the latter it may be seen that each factor must be larger than the largest prime tested. Furthermore there are now only a limited number of potential factors (p, q, r, . . . ) depending on the size of the largest prime test.

The multiple tests above in combination have a synergistic effect. The goal of which is to greatly reduce the freedom of action of an adversary. Even if an attack is not totally impossible, partial key validation can make an attack much more difficult, hopefully infeasible or at least uneconomical.

Furthermore in validating the modulus n, p and q are not supposed to be too close in value therefore assume they are and try to factor R. Use the square root of n as a starting guess for p and q. Then let p decrease while q increases and determine if n can be factored up to a predetermined limit. Furthermore we know for a set of RSA moduli, no prime should repeat therefore given a set of RSA moduli n1, n2 the GCD (ni, nj) can be calculated to ensure the results all equal one.

Offline tests as described above have their limitations. These tests may be extended since the owner of the parameters knows particular information, for example the factorization of n. Thus the owner may be used as an online oracle. By determining if the answers to these questions asked of the oracle are incorrect anyone may declare public key invalid.

It is shown in the Handbook of Applied Cryptography Vanstone et. al. that the owner can take square roots mod n, but others cannot. The validater can determine if a random number mod n has a Jacobi symbol 1 or −1, then half are 1 and the other half are −1. If 1, then number is either a square or not a square, again half each. Validater can square a number mod n. A square always has Jacobi symbol=1.

The validater selects either a known square u or a random element r with Jacobi symbol=1. Asks owner "If this is a square?" for these two types of elements. The owner responds either Yes or No. If u was selected, the owner must say Yes, else key modulus is invalid. If r was selected the owner should say Yes about ½ the time and No about ½ the time, else key modulus is invalid.

This is repeated a number of times to be confident. If the Validater gave the owner all squares, owner should always respond Yes. If the Validater gave the owner all random elements with Jacobi Symbol=1, owner should respond ½ of the time Yes and ½ of the time No. Owner of bogus key only knows that at least half the answers should be Yes. However, owner of the private key knows the factorization of n, they know the squares and thus just need to lie about the pseudosquares, saying some are squares, in order to fool the validater. What is needed is a way for the validater to ask the "Is this a square?" question using a known pseudosquare. Normally, determining if a number is a pseudosquare for a given modulus without knowing the factorization of the modulus is an infeasible problem, however, the owner must respond to the above questions with an answer that says that some of the Jacobi=1 numbers are pseudosquares. The validater can form arbitrary known pseudosquares by multiplying a known pseudosquare by a square modulo the modulus. The result will be a value that the validater knows is a pseudosquare. This third type of value t (known pseudosquare) can be asked of the owner and now lies by the owner saying that some pseudosquares are squares can be detected by the validater.

In order to validate e and n together GCD(e, p−1)=1 and GCD(e, q−1)=1. If e is odd, we know p should not be of form xe+1 for some integer x and q should not be of form ye+1 for some integer y. If both p and q are bad then n should not be of form $xye^2+xe+ye+1$ and n. ≠1 mod e.

A further method Of validating a and n together. It is know that the GCD(e,phi(n)) should be 1. If it is known that phi(n)= (p−1)(q−1), then this is two equations in two unknowns and therefore the validater can factor n.

Assuming the other requirements on a key pair are met, the reason GCD(e, phi(n))=−1 is needed is to ensure the operation using e is a one-to-one (invertible) function. Else, the operation using e is many-to-one. If the operation using e is many-to-one then d (the inverse of e) does not exist, at least as normally conceived. The owner should give evidence that d actually exists, but the question should not be under the private key owner's control, that is, a self-signed certificate request may not be enough evidence.

The challenge can send the claimed owner some dummy messages to sign. The owner of the private key can verify that they are dummy messages, sign them, and return them to the challenger. This is an online probabilistic oracle test that d exists.

Thus anyone can do offline validation at any time. Anyone can do online validation if owner is online. Owner can do offline and online validation to assure him/herself public key is valid. CA can do online validation and tell others exactly what and how much it validated in the pubic key certificate.

In the ECDSA the system parameters are field size q=p or $2^m$. An optional seed that generates (a, b) with (a, b) defining an elliptic curve over $F_q$, P a distinguished point on the curie, n, the large prime order of P, h, the cofactor such that the order of curve is hn. The field size, EC defined by (a, b) and point P are primary parameters.

Thus it may be seen that key validation may reduce exposure to attacks and help detect inadvertent errors and is also is a valuable service for a CA to perform. Those of ordinary skill in the art will appreciate that the above techniques and methods may be implemented on a suitable processor to carry out the steps of the invention. In addition although the various methods described are conveniently implemented in a general purpose computer selectively activated or reconfigured by software, one of ordinary skill in the art would also recognize that such methods may be carried out in hardware, in firmware or in more specialized apparatus constructed to perform the required method steps.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method performed by a computing device in a communication system, the method comprising:
   obtaining a public key;
   testing, by a computing device, whether said public key is equal to an identity element of a prime-order subgroup associated with said communication system;

rejecting said public key if said public key equals said identity element; and performing a cryptographic operation associated with the public key, the cryptographic operation comprising at least one of: a verification of a signature using the public key; a key agreement scheme; enciphering a symmetric key with the public key; and a certification of the public key.

2. The method of claim 1, wherein obtaining the public key comprises receiving the public key.

3. The method of claim 1, wherein the subgroup is a subgroup of a group, and the order of the group is a prime number.

4. The method of claim 1, wherein said subgroup comprises points on an elliptic curve defined over a finite field, the number of said points being a prime number, and said testing comprises testing whether the public key is a point on said elliptic curve.

5. The method of claim 4, wherein testing whether the public key is a point on said elliptic curve comprises a substitution of the public key into an equation defining the elliptic curve.

6. The method of claim 1, wherein said subgroup comprises points on an elliptic curve defined over a finite field, and the method further comprises testing whether the public key is a point on said elliptic curve.

7. The method of claim 6, wherein testing whether the public key is a point on said elliptic curve comprises a substitution of the public key into an equation defining the elliptic curve.

8. A non-transitory computer-readable medium comprising instructions that are operable when executed by one or more processors to perform operations for validation of a public key, the public key for use in a communication system, the operations comprising:

obtaining the public key;

testing whether said public key is equal to an identity element of a prime-order subgroup associated with said communication system;

rejecting said public key if said public key equals said identity element; and performing a cryptographic operation associated with the public key, the cryptographic operation comprising at least one of: a verification of a signature using the public key; a key agreement scheme; enciphering a symmetric key with the public key; and a certification of the public key.

9. The computer-readable medium of claim 8, wherein said subgroup comprises points on an elliptic curve defined over a finite field, the number of said points being a prime number, and said testing comprises testing whether the public key is a point on said elliptic curve.

10. A computing device operable to perform validation of a public key, the public key for use in a communication system, the computing device comprising:

one or more processor devices configured to:
obtain the public key;
test whether said public key is equal to an identity element of a prime-order subgroup associated with said communication system;
rejecting said public key if said public key equals said identity element; and
performing a cryptographic operation associated with the public key, the cryptographic operation comprising at least one of: a verification of a signature using the public key; a key agreement scheme; enciphering a symmetric key with the public key; and a certification of the public key.

11. The computing device of claim 10, wherein to test, the one or more processor devices are configured to compare said public key to said identity element of said subgroup and confirm that there is no match.

* * * * *